(No Model.)
S. RAUH.
METHOD OF MAKING ARMPIT SHIELDS.
No. 371,705. Patented Oct. 18, 1887.
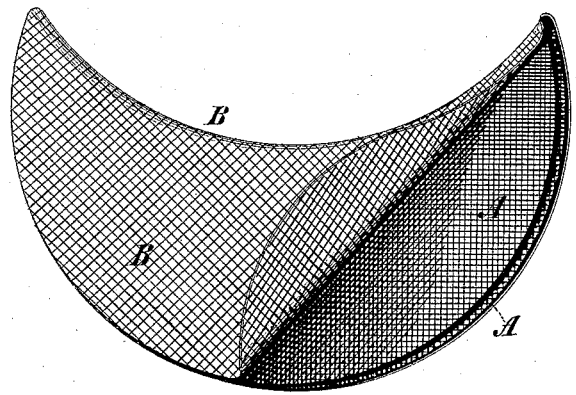
WITNESSES:
INVENTOR

UNITED STATES PATENT OFFICE.

SAMUEL RAUH, OF NEW YORK, N. Y.

METHOD OF MAKING ARMPIT-SHIELDS.

SPECIFICATION forming part of Letters Patent No. 371,705, dated October 18, 1887.

Application filed January 13, 1887. Serial No. 224,212. (No model.)

*To all whom it may concern:*

Be it known that I, SAMUEL RAUH, a subject of His Majesty the King of Bavaria, and a resident of New York, in the county of New York and State of New York, have invented certain new and useful Improvements in Armpit-Shields, of which the following is a specification.

The invention relates to improvements in armpit shields, and has for its object the production of a light, flexible, and durable shield which has the advantages of an absorbent outer covering or surface and a lining or interior surface which is impervious to moisture.

In the accompanying drawing I have shown a representation which is illustrative of my invention, and will serve to assist in understanding the description thereof and of the manner in which it is made, as hereinafter set forth.

I take a piece of unvulcanized rubber of an appropriate kind and of suitable quality, which is formed into the desired shape and properly arranged and prepared to be utilized as a lining or interior surface for the shield. In the drawing this part of the shield is indicated by the letter A. The lining, having been formed of unvulcanized rubber, as aforesaid, will be in a plastic condition, which condition must be preserved during the first part of the process of manufacture. The outer covering or surface, B, which, it is well understood, should be of an absorbent nature, is made of a textile fabric or felted goods, by preference of the fabric commonly known as "stockinet," and is conformed in shape to the purpose for which it is designed. The two parts A and B having been formed as aforesaid, the lining is placed upon a saddle and the outer covering of textile fabric placed over it and the two united by any convenient means. The inner section or lining, being of unvulcanized rubber and in a plastic condition, readily unites with the textile or other fabric, thus forming what is tantamount to a single piece of material. The parts having been united, the shield is given the desired shape by trimming the edges, and the rubber side is then suitably vulcanized in any convenient way by methods well understood in the art. The article is then ready for the market.

I do not claim, broadly, a shield consisting of an outer surface of stockinet and a lining of rubber, as such shields have long been known; but

What I claim is—

The method of manufacturing armpit-shields, consisting in, first, forming the pieces of unvulcanized-rubber lining into the form of the finished shield; second, conforming the textile fabric to the shape of the finished article; third, uniting the fabric and rubber lining, and, fourth, vulcanizing the rubber lining.

Signed at New York, in the county of New York and State of New York, this 11th day of January, A. D. 1887.

SAMUEL RAUH.

Witnesses:
HERMAN GUSTOW,
FREDERICK C. RIECKERS.